US012612081B2

(12) United States Patent
Hazard et al.

(10) Patent No.: US 12,612,081 B2
(45) Date of Patent: Apr. 28, 2026

(54) AGENT IMPORTANCE PREDICTION FOR AUTONOMOUS DRIVING

(71) Applicant: Motional AD LLC, Boston, MA (US)

(72) Inventors: Christopher Hazard, Pittsburgh, PA (US); Akshay Bhagat, Pittsburgh, PA (US); Balarama Raju Buddharaju, Pittsburgh, PA (US); Zhongtao Liu, Apex, NC (US); Yunming Shao, Fremont, CA (US); Lu Lu, Upton, MA (US); Sammy Omari, Pittsburgh, PA (US); Henggang Cui, Allison Park, PA (US)

(73) Assignee: Motional AD LLC, Boston, MA (US)

( * ) Notice: Subject to any disclaimer, the term of this patent is extended or adjusted under 35 U.S.C. 154(b) by 247 days.

(21) Appl. No.: 18/123,607

(22) Filed: Mar. 20, 2023

(65) Prior Publication Data

US 2023/0294741 A1     Sep. 21, 2023

Related U.S. Application Data

(60) Provisional application No. 63/321,386, filed on Mar. 18, 2022.

(51) Int. Cl.
*B60W 60/00*          (2020.01)
*B60W 30/095*        (2012.01)
(Continued)

(52) U.S. Cl.
CPC ....... *B60W 60/0027* (2020.02); *G05B 13/027* (2013.01); *G05B 13/048* (2013.01);
(Continued)

(58) Field of Classification Search
CPC ......... B60W 60/0027; B60W 30/0956; B60W 60/001; B60W 60/0011; B60W 60/00276;
(Continued)

(56) References Cited

U.S. PATENT DOCUMENTS

2019/0278290 A1* 9/2019 Zhang ....................... G01S 7/40
2020/0159215 A1* 5/2020 Ding ...................... G06N 3/045
(Continued)

FOREIGN PATENT DOCUMENTS

CN          116090516 A  *  5/2023  ............. G06N 3/042
DE      102019115707 A1 *  5/2020  ...... B60W 30/18163
WO    WO-2022248723 A1 *  12/2022  ............. G06N 3/006

OTHER PUBLICATIONS

HSTA: A Hierarchical Spatio-Temporal Attention Model for Trajectory Prediction (Year: 2021).*
(Continued)

*Primary Examiner* — Ramon A. Mercado
*Assistant Examiner* — Tyler Roger Robarge
(74) *Attorney, Agent, or Firm* — Fish & Richardson P.C.

(57) ABSTRACT

A method, a system, and a non-transitory storage media for determining agent importance prediction for autonomous driving. Input features associated with agents present in an environment surrounding a vehicle are processed. Output features associated with the agents are determined based on the input features. An importance of each agent is predicted using the output features. One or more movements of the vehicle are determined based on the predicted agent importance.

20 Claims, 15 Drawing Sheets

(51) Int. Cl.
| | |
|---|---|
| *G05B 13/02* | (2006.01) |
| *G05B 13/04* | (2006.01) |
| *G06N 3/0464* | (2023.01) |
| *G06N 20/00* | (2019.01) |

(52) U.S. Cl.
CPC ....... *G06N 3/0464* (2023.01); *B60W 30/0956* (2013.01); *B60W 60/001* (2020.02); *B60W 60/0011* (2020.02); *B60W 2420/403* (2013.01); *G06N 20/00* (2019.01)

(58) Field of Classification Search
CPC .. G05B 13/027; G05B 13/048; G06N 3/0464; G06N 3/045
See application file for complete search history.

(56) References Cited

U.S. PATENT DOCUMENTS

| | | | | |
|---|---|---|---|---|
| 2021/0064044 | A1* | 3/2021 | Refaat | G05D 1/0219 |
| 2021/0374562 | A1* | 12/2021 | Chang | G06N 5/04 |
| 2022/0017122 | A1* | 1/2022 | Malla | G06N 3/049 |
| 2022/0043446 | A1* | 2/2022 | Ding | G06N 3/08 |
| 2022/0292360 | A1* | 9/2022 | Shen | G06N 3/045 |
| 2023/0166764 | A1* | 6/2023 | Johnson | B60W 30/095 701/23 |
| 2023/0342635 | A1* | 10/2023 | Puphal | G06N 5/022 |
| 2023/0419113 | A1* | 12/2023 | Genc | G06F 16/904 |
| 2024/0119276 | A1* | 4/2024 | Rigotti | G06N 3/084 |

OTHER PUBLICATIONS

GSAN: Graph Self-Attention Network for Learning Spatial–Temporal Interaction Representation in Autonomous Driving (Year: 2022).*
GSAN: Graph Self-Attention Network for Interaction Measurement in Autonomous Driving (Year: 2020).*
L. Ye, Z. Wang, X. Chen, J. Wang, K. Wu and K. Lu, "GSAN: Graph Self-Attention Network for Interaction Measurement in Autonomous Driving," 2020 IEEE 17th International Conference on Mobile Ad Hoc and Sensor Systems (MASS), Delhi, India, 2020, pp. 274-282, doi: 10.1109/MASS50613.2020.00042. (Year: 2020).*
Y. Wu et al., "HSTA: A Hierarchical Spatio-Temporal Attention Model for Trajectory Prediction," in IEEE Transactions on Vehicular Technology, vol. 70, No. 11, pp. 11295-11307, Nov. 2021, doi: 10.1109/TVT.2021.3115018. (Year: 2021).*
[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
Hazard et al., "Importance is in your attention: agent importance prediction for autonomous driving," CoRR, Submitted on Apr. 19, 2022, arXiv:2204.09121v1, 4 pages.
International Search Report and Written Opinion in International Appln. No. PCT/US2023/015646, mailed on Jul. 7, 2023, 12 pages.
Messaoud et al., "Attention based vehicle trajectory prediction," IEEE Transactions on Intelligent Vehicles, Mar. 2021, 6(1):175-185.
International Preliminary Report on Patentability in International Appln. No. PCT/US2023/015646, mailed on Oct. 3, 2024, 8 pages.

* cited by examiner

700

800

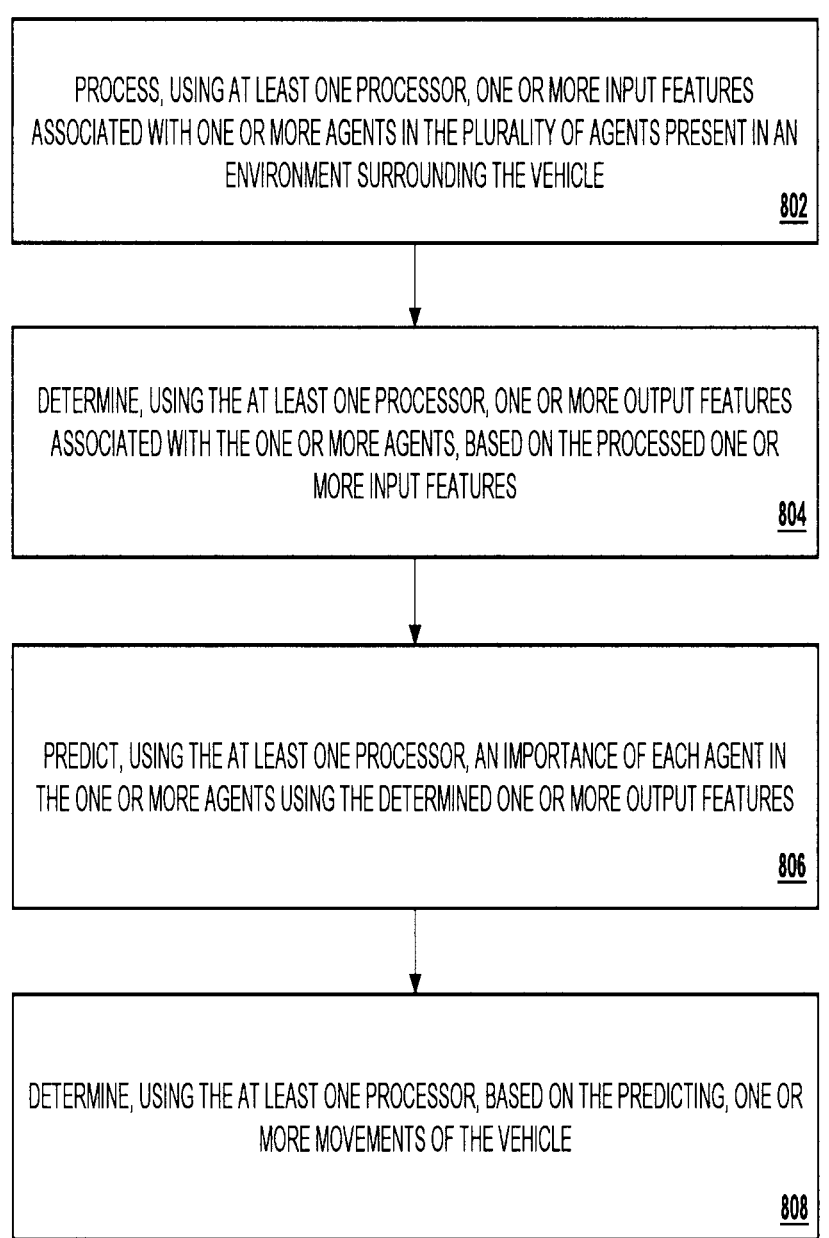

PROCESS, USING AT LEAST ONE PROCESSOR, ONE OR MORE INPUT FEATURES ASSOCIATED WITH ONE OR MORE AGENTS IN THE PLURALITY OF AGENTS PRESENT IN AN ENVIRONMENT SURROUNDING THE VEHICLE

802

DETERMINE, USING THE AT LEAST ONE PROCESSOR, ONE OR MORE OUTPUT FEATURES ASSOCIATED WITH THE ONE OR MORE AGENTS, BASED ON THE PROCESSED ONE OR MORE INPUT FEATURES

804

PREDICT, USING THE AT LEAST ONE PROCESSOR, AN IMPORTANCE OF EACH AGENT IN THE ONE OR MORE AGENTS USING THE DETERMINED ONE OR MORE OUTPUT FEATURES

806

DETERMINE, USING THE AT LEAST ONE PROCESSOR, BASED ON THE PREDICTING, ONE OR MORE MOVEMENTS OF THE VEHICLE

AGENT IMPORTANCE PREDICTION FOR AUTONOMOUS DRIVING

CROSS-REFERENCE TO RELATED APPLICATIONS

The present application claims priority to U.S. Provisional Patent Appl. No. 63/321,386, filed Mar. 18, 2022, and entitled "AGENT IMPORTANCE PREDICTION FOR AUTONOMOUS DRIVING" and incorporates its disclosure herein by reference in its entirety.

BACKGROUND

An autonomous vehicle is capable of sensing its surrounding environment and navigating without human input. Upon receiving data representing the environment and/or any other parameters, the vehicle performs processing of the data to determine its subsequent decisions. The decisions may be intended to provide an ability to safely navigate the vehicle along a selected path, allow access to the vehicle, and/or perform any other functions.

BRIEF DESCRIPTION OF THE FIGURES

FIG. 8 illustrates an example of a process for predicting agent importance for autonomous driving, according to some embodiments of the techniques discussed in the present disclosure.

DETAILED DESCRIPTION

Figure 1:
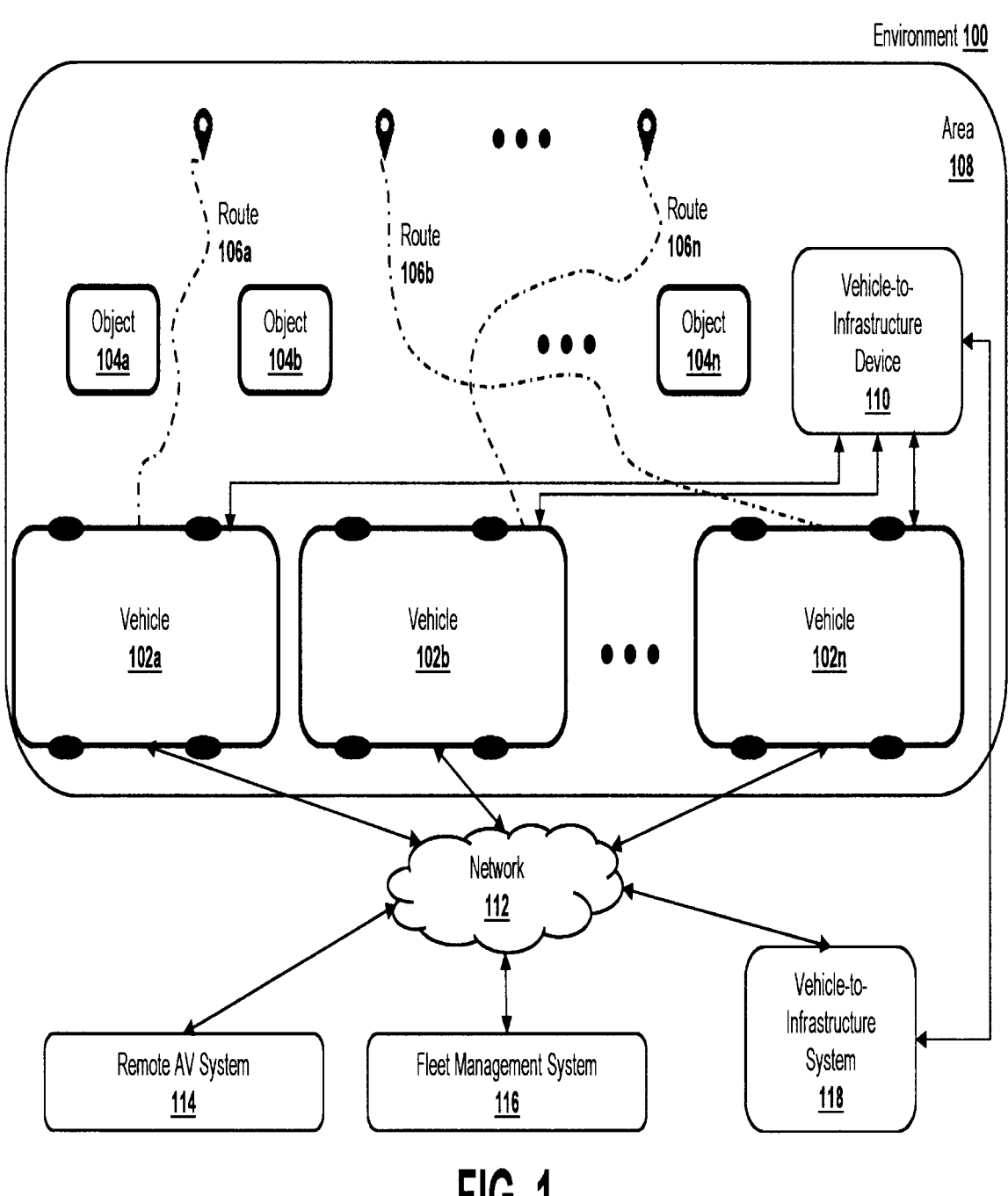
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

A vehicle (e.g., an autonomous vehicle) includes sensors that monitor various parameters associated with the vehicle. For example, some sensors (e.g., cameras, LIDAR sensors, RADAR sensors, SONAR sensors, etc.) monitor/detect changes occurring in the vehicle's environment (e.g., actions and/or presence of other vehicles, pedestrians, street lights, etc.). The information/data received from the sensors is used by the vehicle's controller (or any other processing component) to determine various subsequent actions that can be performed by the vehicle. These include, but are not limited to, determination of a path of travel, direction, speed, and/other movement parameters, etc.

In some embodiments, the techniques discussed in the present disclosure system is configured to perform prediction and/or determination of an agent (e.g., another vehicle, pedestrian, an object, etc.) importance for autonomous driving, e.g., determining a path of travel of an autonomous vehicle. To do so, one or more input features associated with one or more agents in the plurality of agents present in an environment surrounding the vehicle are processed (e.g., by the ego vehicle's controller). One or more output features associated with the one or more agents are determined based on the processed one or more input features. An importance value of each agent using the determined output features is predicted. One or more movements of the vehicle are determined based on the predictions.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited look-ahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
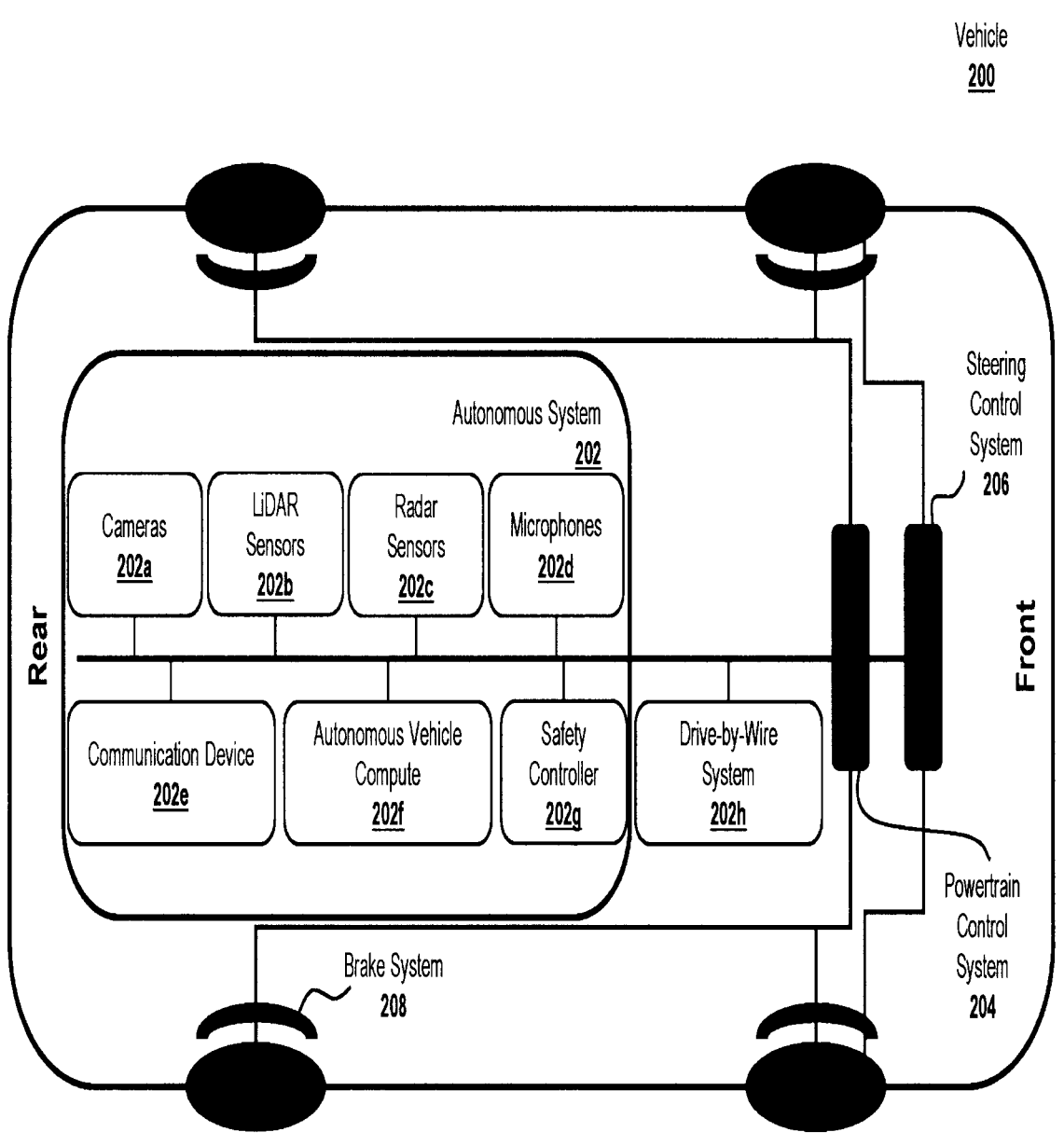
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
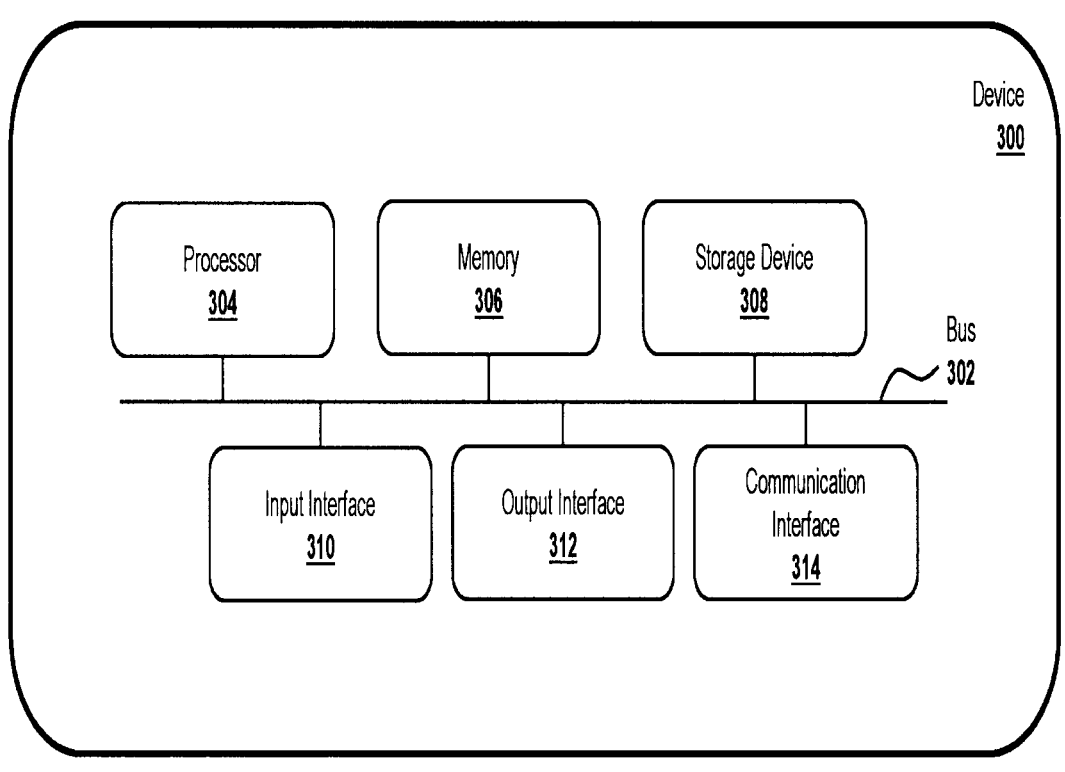
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle compute 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of 202 and/or 202 (*a-h*), and/or one or more devices of network 112 (e.g., one or more devices of a system of network 112). In some embodiments, one or more devices of vehicles 102 (e.g., one or more devices of a system of vehicles 102), one or more devices 202 and/or 202 (a-h), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 306 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments, perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406, and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
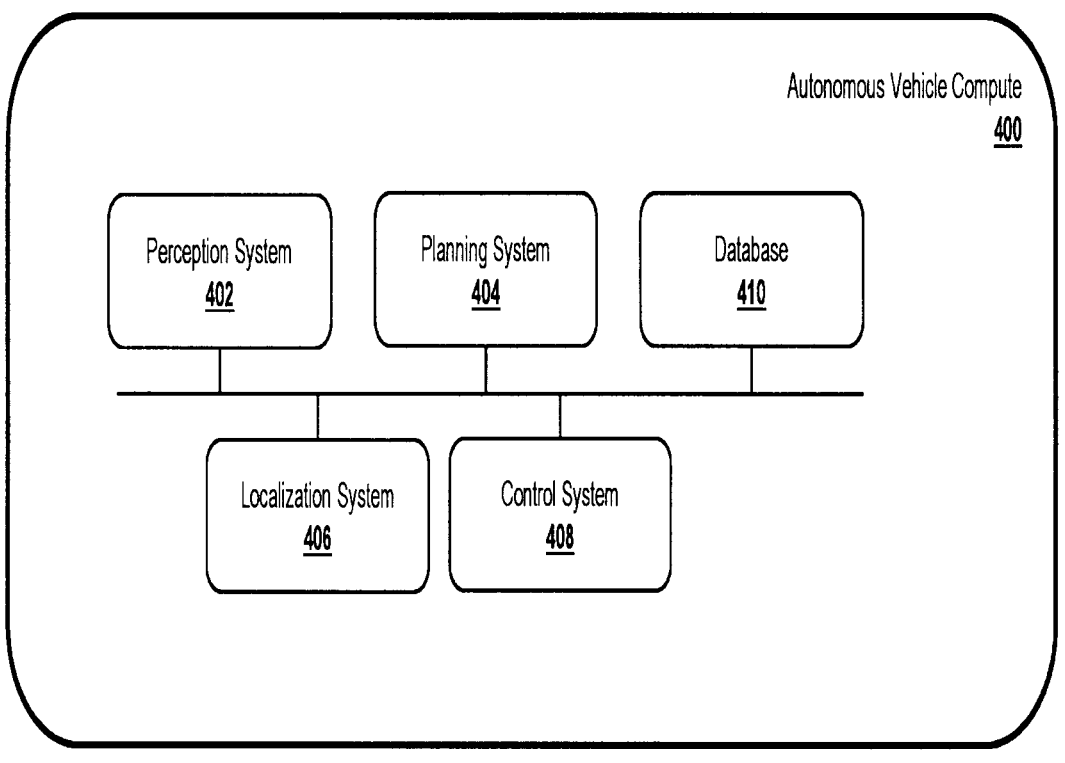
FIG. 4A is a diagram of certain components of an autonomous system.
Figure 4B:
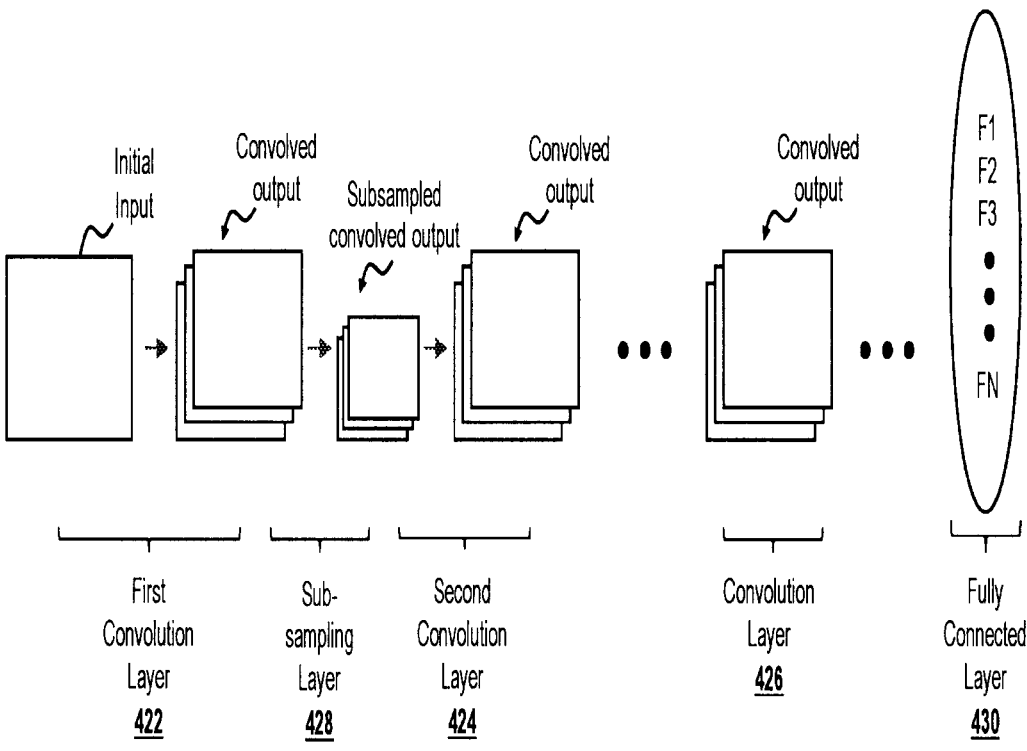
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (e.g., an amount of nodes) that is less than a dimension of an upstream system. By virtue of subsampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
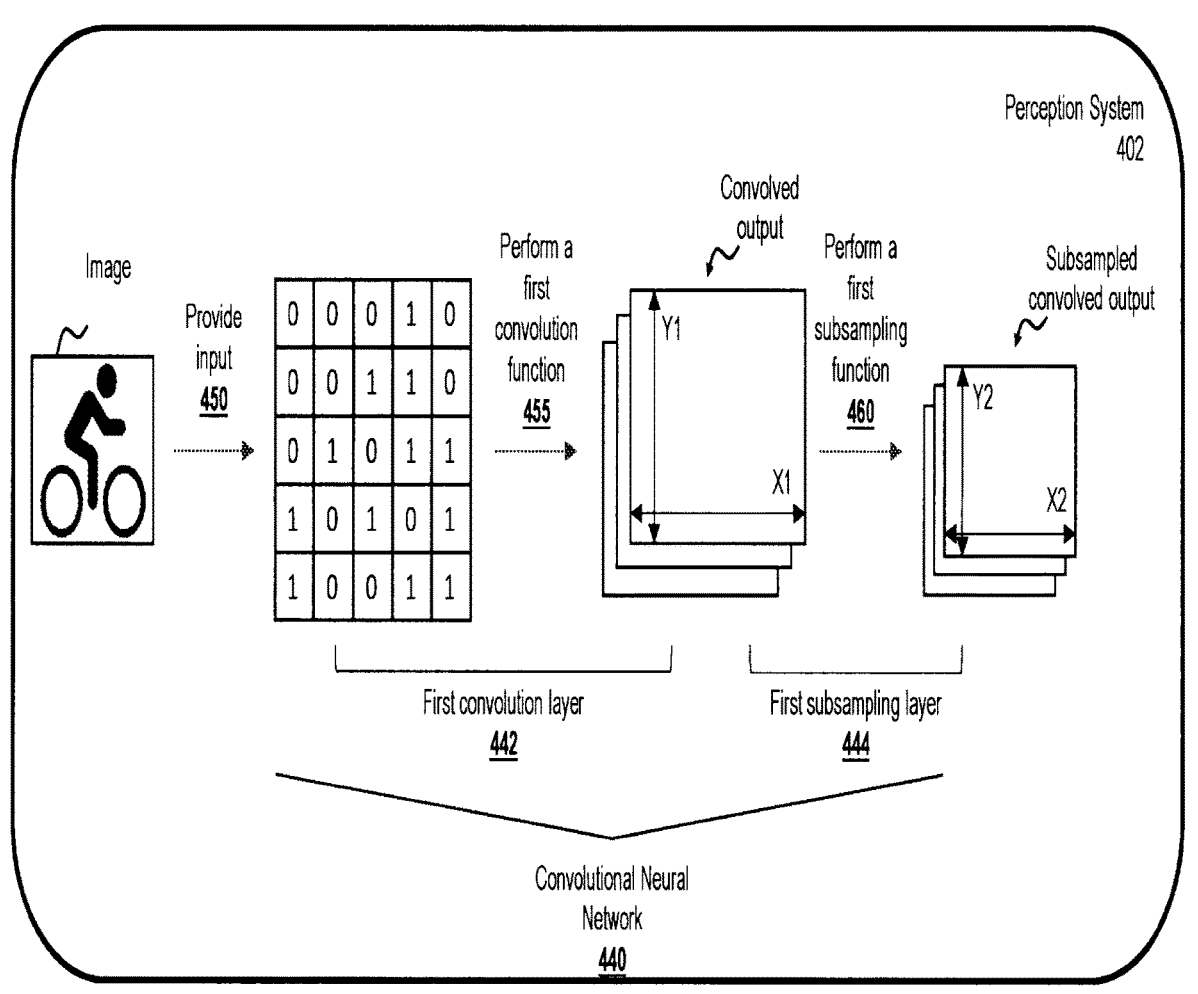
FIGS. 4C and 4D are a diagram illustrating example operation of a CNN.
Figure 4D:
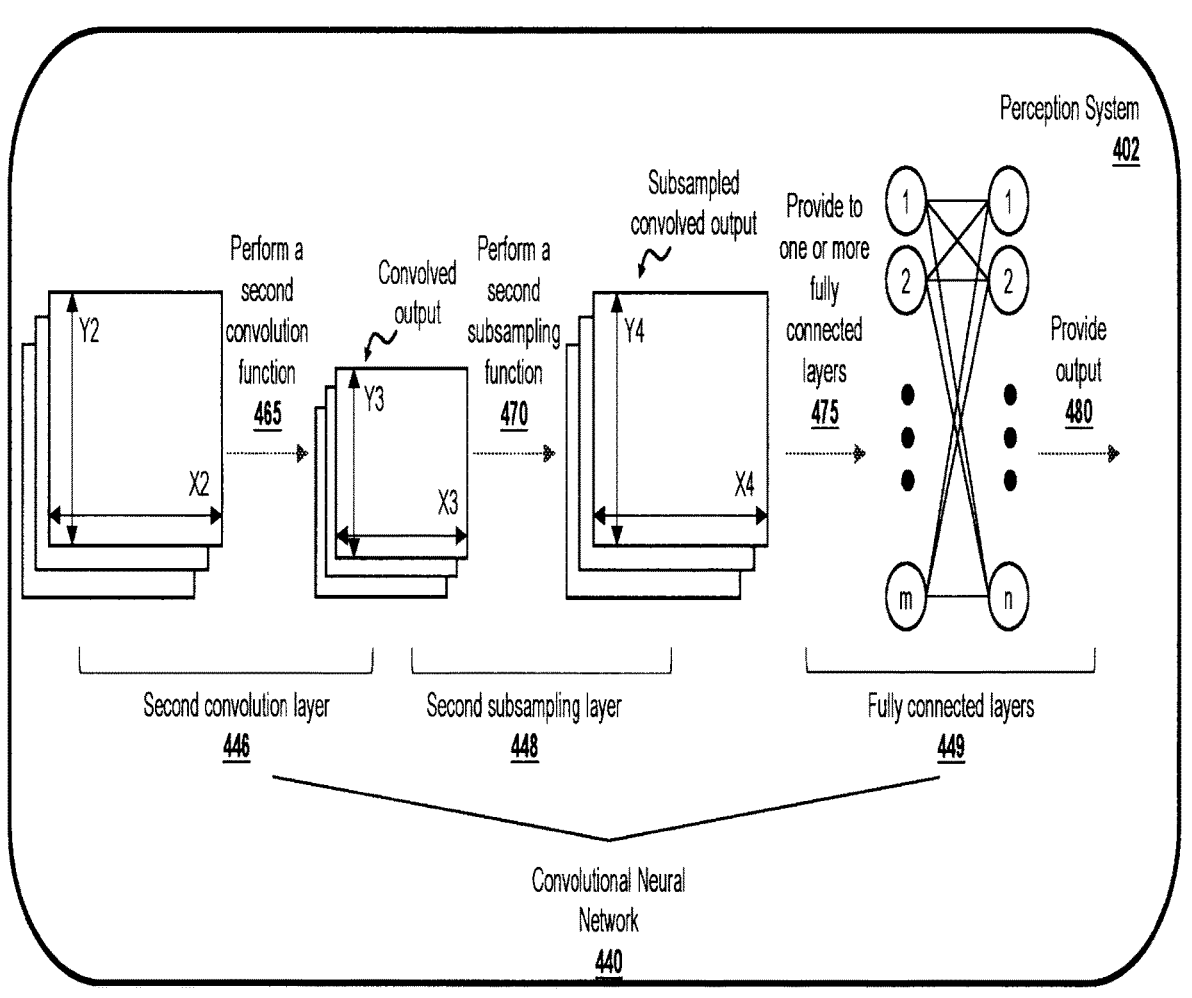

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 4E:
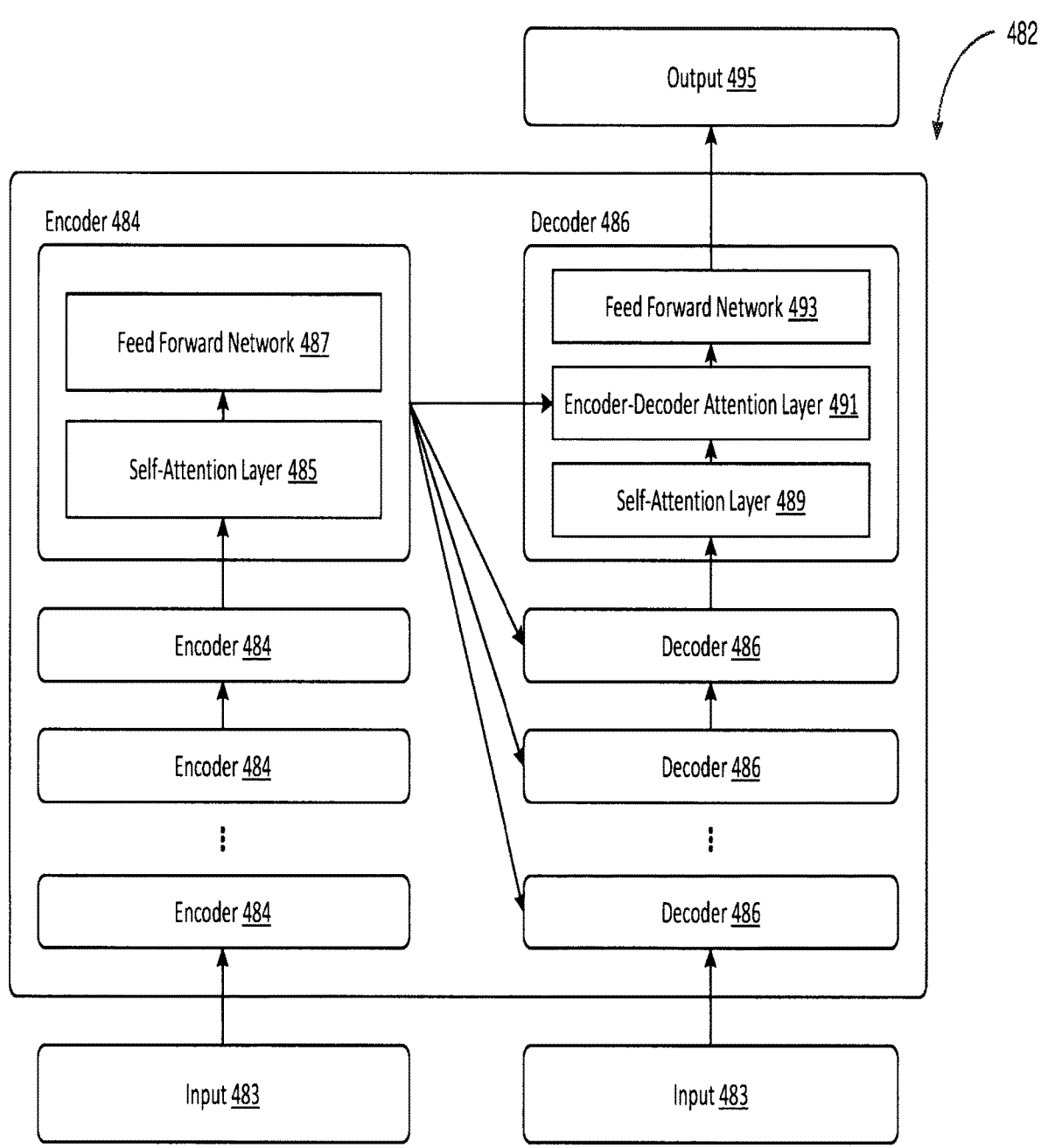
FIG. 4E is a diagram of an implementation of a transformer model.

Referring now to FIG. 4E, illustrated is a diagram of an implementation of a machine learning model. More specifically, illustrated is a diagram of an implementation of a transformer model 482. In some example embodiments, the transformer model 482 may implement the perception system 402, the planning system 404, the localization system 406, and/or control system 408. As will be described in more detail, the transformer model 482 may include a self-attention mechanism to capture the relative significance and relationship between different portions of an input 483. For instance, in cases where the input 483 is an image (e.g., of the environment proximate to a vehicle), the self-attention mechanism of the transformer model 482 may capture the relative significance and relationship amongst different portions (or patches) of the image when generating an output 495 that includes, for example, one or more labels classifying one or more objects present in the image. While the transformer model 482 includes certain features as described herein, these features are provided for the purpose of illustration and are not intended to limit the present disclosure.

As shown in FIG. 4E, the transformer model 482 may include an encoder stack having a plurality of encoders 484 (or encoding layers) coupled with a decoder stack having a plurality of decoders 486 (or decoding layers). In the example shown in FIG. 4E, the input 483 (e.g., the embedding of each individual portion of the input 483) flows through successive encoders 484, with the output of the final encoder 484 being passed to every decoder 486 in the decoder stack. For example, in some cases, each encoder 484 in the encoder stack may generate an encoding that contains information about which parts of the input 483 are relevant to each other. Moreover, the output of one encoder 484 may be passed on as an input to the next encoder 484 in the encoder stack. Accordingly, in some cases, the first encoder 484 in the encoder stack may generate a first encoding of the input 483 (e.g., the embedding of each individual portion of the input 483) while the next encoder 484 in the encoder stack may generate a second encoding of the first encoding.

As shown in FIG. 4E, in some cases, each encoder 484 may include self-attention layer 485 and a feed-forward network 487. Each portion of the input 483 (e.g., each embedded portion of the input 483) may flow through its own path in the encoder 484, with the self-attention layer 485 determining the relationship (or association) between each individual portion of the input 483. For example, in cases where the input 483 is an image, the self-attention layer 485 may determine the relationship between different portions (or patches) of the image. In doing so, the self-attention layer 485 enables the encoder 484 to generate a context-aware encoding of the input 483 where the encoding for each individual portion of the input 483 incorporates weighted values corresponding to the other portions of the input 483. For instance, in some cases, the encoding for a first portion of the input 483 (e.g., a first embedding of the first portion of the input 483) may be generated to incorporate a first value corresponding to a second portion of the input 483 and a second value corresponding to a third portion of the input 483, with the first value and the second value being weighted to reflect how much the second portion and the third portion of the input 483 should affect the encoding for the first portion of the input 483. In some cases, the self-attention layer 485 may include a multi-headed attention mechanism, with each head applying a different set of weights (e.g., query, key, and value weight matrices) for incorporating the other portions of the input 483. It should be appreciated that the weights (e.g., query, key, and value weight matrices) applied by the self-attention layer 485 may be learned during the training of the transformer model 482.

Referring again to FIG. 4E, the decoder stack may decode the input 483 to generate the output 495 based on attention vectors output by the final encoder 484 in the encoder stack, with each decoder 486 in the decoder stack successively decoding the output of the previous decoder 486. For example, the first decoder 486 in the decoder stack may generate a first decoding of the input 483 (e.g., the embedding of each individual portion of the input 483) while the next decoder 486 in the decoder stack may generate a second decoding of the first decoding. As shown in FIG. 4E, each decoder 486 may include a self-attention layer 489, an encoder-decoder attention layer 491, and a feed forward network 493. The self-attention layer 489 of the decoder 486 may enable the decoder 486 to generate a context-aware decoding of the input 483 where the decoding for each individual portion of the input 483 incorporates weighted values corresponding to one or more preceding portions of the input 483. Meanwhile, the encoder-decoder attention layer 491 may determine, based at least on the attention vectors output by the final encoder 484 of the encoder stack, weighted values indicative of the relative significance of each corresponding portion of the input 483.

Figure 5A:
FIGS. 5A and 5B illustrate examples of a system implementing an agent importance prediction for the purposes of autonomous operation of a vehicle, according to some embodiments of the techniques discussed in the present disclosure.

Referring now to FIG. 5A, illustrated is a diagram of a system 500 that predicts agent (e.g., other vehicles, pedestrians, objects, etc.) importance score for autonomous vehicle driving. The system 500 includes one or more sensors 502, a vehicle controller 504, and drive-by-wire (DBW) component 506. The system 500 can also incorporate other components associated with operation of an autonomous vehicle (as described above). The vehicle controller 504 can include an agent importance prediction model 508. The model 508 can include any of the features of the components and/or devices such as those shown and discussed above in connection with FIGS. 4B-4D.

The vehicle (e.g., an autonomous vehicle, such as vehicle 200 described with reference to FIG. 2) includes sensors 502 that monitor various parameters associated with the vehicle. For example, some sensors monitor and/or detect changes occurring in the vehicle's environment, while others monitor and/or detect various aspects associated with operational aspects of the vehicle. Any information and/or data transmitted by the sensors to the vehicle's controller (or any other processing component) is used by the controller's planner component ("planner") to determine a path of travel, direction, speed, and/or other movement and/or maneuver parameters. Such information and/or data includes information and/or data about one or more other agents (e.g., vehicles, pedestrians, objects, etc.) in the vehicle's environment. The actions of the detected agents can interfere with a path of travel, requiring an adjustment of the path travel, direction, speed, and/or other movement and/or maneuver parameters.

Figure 5B:
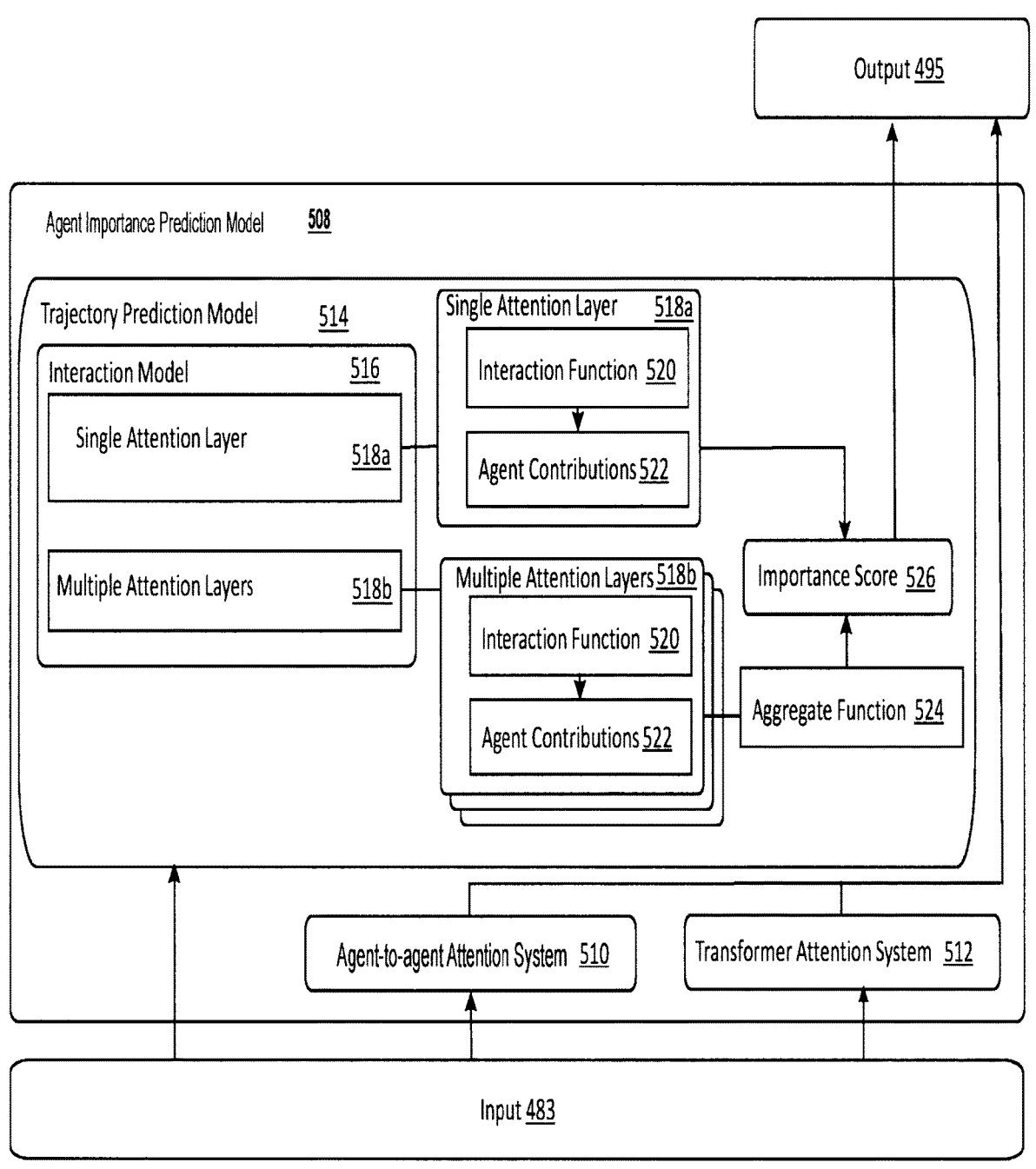

The vehicle path and movement adjustments relative to the detected agents can be based on an agent importance prediction. As shown in FIGS. 5A and 5B, the vehicle controller 504 includes an agent importance prediction model 508 for the purposes of autonomous driving and/or operation of an ego vehicle (e.g., an autonomous vehicle), according to some embodiments of the techniques discussed in the present disclosure. The agent importance prediction may be performed by the agent importance prediction model 508 of an autonomous vehicle to determine, for example, predictions that represent a degree to which an agent's actions (relative to the operating AV) can affect operation of the autonomous vehicle. The degree can indicate a probability level that an agent's actions can interfere with a path of travel requiring an alteration of the trajectory of travel by the autonomous vehicle to avoid a potential collision. As stated above, the agent can include other vehicles, pedestrians, objects, etc. that may be present in the vehicle's environment. The system 500 can be incorporated into a vehicle (e.g., vehicle 102 shown in FIG. 1, vehicle 200 shown in FIG. 2, etc.).

The vehicle's sensors 502 (e.g., cameras 202*a*, LiDAR sensors 202*b*, radar sensors 202*c*, microphones 202*d*, communication device 202*e*, safety controller 202*g*, and/or DBW system 202*h* described with reference to FIG. 2) monitor various parameters associated with the vehicles. The parameters can include, but are not limited to, parameters associated with vehicle's state, e.g., heading, driving speed, etc. Additionally, the parameters can include, but are not limited to, parameters associated with vehicle's health, e.g., tire inflation pressure, oil level, transmission fluid temperature, etc. The vehicle's sensors (e.g., camera, LIDAR, SONAR, etc.) can further monitor various parameters associated with an environment surrounding the vehicle. These parameters can include, but are not limited to, parameters associated with other vehicles (e.g., speed, direction, etc.) and/or other objects (e.g., pedestrians, light poles, etc.). The sensors 502 supply data for one or more measured and/or monitored parameters to the vehicle controller 504.

The vehicle controller 504 can determine a trajectory prediction used for autonomous driving. Some trajectory prediction models often use attention mechanisms to model the interaction between agents. As shown in FIGS. 5A and 5B, the agent importance prediction model 508 can analyze attention information from history input or future input, to generate a forward prediction or a backward prediction measure an importance score of each agent with respect to the ego vehicle's future planned or past trajectory, respectively. For example, the vehicle controller 504 can be trained using backward prediction that processes a future input (agent data and lane data corresponding to a first time point) to generate a history prediction (agent data and lane data corresponding to a second time point that is prior to the first time point) that can be compared to history data recorded at the second time point to determine the difference between the predicted and recorded data to adjust the prediction model used by the vehicle controller 504. The vehicle controller 504 can use the adjusted prediction model for forward prediction by processing historical data (agent data and lane data corresponding to a past and/or current time point) as input to generate a future prediction (agent data and lane data corresponding to a future point). The vehicle controller 504 can process information and/or data to effectively find and rank surrounding agents by their impact on the ego vehicle's plan.

In order to navigate in the dynamic environment, an autonomous vehicle needs to detect the current locations of the other agents in the environment and predict their future trajectories. In some implementations, the vehicle controller 504 can include trajectory prediction models that use deep neural networks with attention mechanisms to model the interactions between agents. The prediction models can include the ego vehicle in the interaction graph in order to model the interactions between the other agents and the ego vehicle.

In some implementations, the vehicle controller 504 can include a downstream motion planning system (e.g., planning system 404 described with reference to FIG. 4) that can be included in the agent importance prediction model 508 that can determine how much another agent is likely to affect the future maneuvering of the ego vehicle. For example, an agent that is currently behind and traveling away from the ego is not likely to have much impact on the ego's plan while a vehicle making a lane change in front of the ego is very significant. With this knowledge, the motion planning system of the agent importance prediction model 508 can focus the computational resources on handling the more important agents and potentially use coarser-grained methods to handle agents determined as having low importance score.

Referring now to FIG. 5B, illustrated is a diagram of an implementation of an example of an agent importance prediction model 508. In some example embodiments, the example agent importance prediction model 508 may include an agent to agent attention system 510, a transformer attention system 512, and/or a trajectory prediction model 514.

As illustrated in FIG. 5B, the agent importance prediction model 508 described in the present disclosure can be used to determine the importance score 526 of the agents. The agent importance prediction model 508 can be configured as an agent classification problem, based on a training as described with reference to FIG. 4E, providing an output based on the importance score 526. In some embodiments, the agent importance prediction model 508 predicts the importance score 526 of the agents without requiring any extra training labels, using a built-in attention mechanism to model the interactions between agents in a graph. The agent importance prediction model 508 can use attention weights between the ego vehicle and detected agents defined in the input 483, to represent the degree, to which the existence of each agent affects the predicted maneuvering of the ego vehicle. In some implementations, the attention weights can be shared between a forward prediction and a backward prediction (as described with reference to FIG. 4E) to increase an accuracy of the output of the agent importance prediction model 508.

The agent importance prediction model 508 can determine agent importance scores that can be used in autonomous driving stacks, typically calculated with the use of human labelled ground-truth importance scores. In some cases, label quality can be difficult to control due to the subjective nature of the labeling task. To address labeling limitations, traditional systems generate the ground-truth labels by running an existing planner in simulation on the dataset and labeling the agent importance score based on the planner cost. The agent importance prediction model 508 discussed in the present disclosure does not require any ground-truth labels to train.

The agent importance prediction model 508 can predict the future trajectories of a set of agents, given the respective history tracks of the agents and map information. Since the behavior of an agent also depends on the state of the other agents, the agent importance prediction model 508 can use the trajectory prediction model to be able to model the interactions between agents when making predictions. The graph attention mechanism is one of the most popular approaches for modeling such agent interactions.

In some embodiments, the agent importance prediction model 508 can use the agent-to-agent attention system 510 to process the input data 483. For example, the agent-to-agent attention system 510 can process the agent input features $$\{x_i\}_{i=1}^N,$$

to compute agent's $$\{y_i\}_{i=1}^N$$

output features as:

$$y_i = x_i W_0 + \sum_j \phi(concat(x_i, \Delta_{i,j}, x_j)W_1)W_2 \tag{1}$$

The agent importance prediction model 508 can be trained using a training dataset. The trained agent importance prediction model 508 can be executed on a predetermined $$\{y_i\}_{i=1}^N$$

number (e.g., 2000) of randomly selected validation samples. The prediction horizon can be a predetermined period of time (e.g., 8 seconds).

In some embodiments, the agent importance prediction model 508 can use the transformer attention system 512 to process the input data 483. For example, the transformer attention system 514 can process the agent input features $$\{x_i\}_{i=1}^N,$$

to compute the agent output features query using query Q, key K, and value V matrices:

$$y = softmax\left(\frac{Q(x)K(x)^T}{\sqrt{d}}\right)V(x) \tag{2}$$

In order to model the interactions between other agents and the ego vehicle, the agent importance prediction model 508 can include the ego vehicle in the interaction graph and predict the future trajectory of the ego vehicle in the same way as the other agents.

In some embodiments, the agent importance prediction model 508 can use the trajectory prediction model 514 to compute the importance score of the agents and to generate to output 495. The trajectory prediction model 514 can include an agent interaction model 516, described with continued reference to FIG. 5B. For example, the trajectory prediction model 514 can process the input data 483 by using the corresponding attention weights with respect to the ego vehicle from the agent to agent interaction model 516. The trajectory prediction model 514 can use as inputs 483 the feature (position) vectors of all N actors (agents) in a scene, denoted as $$\{x_i\}_{i=1}^N.$$

The outputs of the agent importance prediction model 508 can include the output feature vectors with the actor (agent) interactions modeled using the interaction model 516, denoted as $$\{y_i\}_{i=1}^N,$$

$$y_i = Interaction(\{x_j\}_{j=1}^N) \tag{3}$$

The interaction model 516, used by the agent importance prediction model 508 to predict the importance scores y from an agent (with feature $\chi_a$) to the ego vehicle (with feature $\chi_e$), can include a pretrained interaction model. The agent to agent interaction model 516 can be configured to determine an attention vector, for each agent, as an indicator of the underlying importance score 526 of each agent. The interaction model 516 used to predict agent to agent interaction within the scene can include a single attention layer 518a or multiple attention layers 518b.

If the interaction model 516 includes a single attention layer 518a, the agent contributions 522 from each agent j to agent i are computed with an interaction function 520 g. The agent contributions 522 are summed to generate the importance score 526 and used to generate the output 495.

$$y_i = f(x_i) + \frac{\sum_j g(x_i, x_j)}{\text{Normalizer}} \quad (4)$$

Figure 6A:
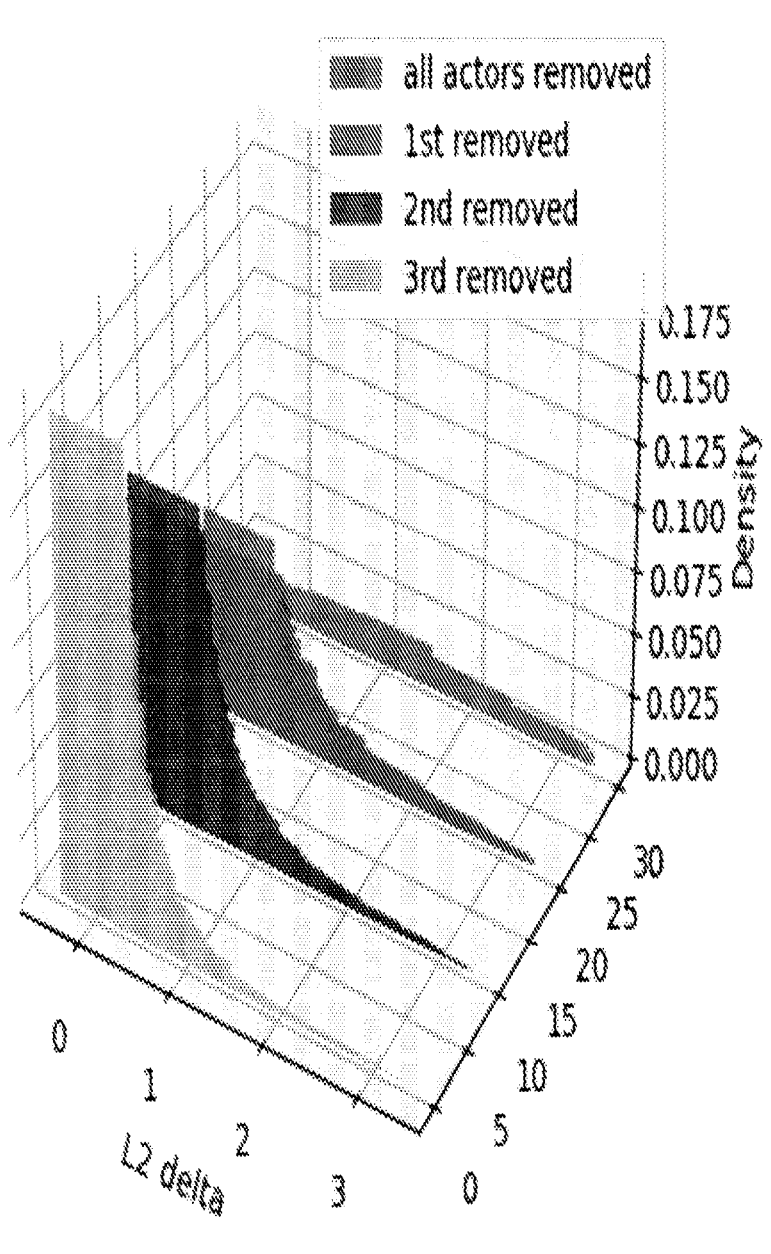
FIGS. 6A and 6B illustrate examples of distribution of ego trajectory delta and attention value changes between pre- and post-removal of agents.

Within the single attention layer 518a formulation, the parameter $g(x_i, x_j)$ is defined as the attention vector from agent j to agent i, (illustrated in FIG. 6B) and can be L2 normalized as the importance score 526 from agent j to agent i, The importance score 526 represents the magnitude of agent j's influence on future trajectory predictions of agent i (as illustrated in FIG. 6A).

$$y(x_i, x_j) = \|g(x_i, x_j)\|_2 \quad (5)$$

The formulation generalizes the attention modules used by trajectory prediction systems, and the transformer attention module used in transformer systems.

Using the summed agent contributions 522 of equation (1), the attention vector can be determined by $$g(x_i, x_j) = \phi(\text{concat}(x_i, \Delta_{i,j}, x_j) W_1) W_2 \quad (6)$$

In the equation (2), the transformer attention includes a softmax operation, which can be expanded as:

$$y_i = \sum_j \frac{e^{Q(x_i)K(x_j)^T}}{\sqrt{d} \sum_k e^{Q(x_i)K(x_k)^T}} V(x_j) \quad (7)$$

$$= \frac{\sum_j e^{Q(x_i)K(x_j)^T)} V(x_j)}{\sqrt{d} \sum_j e^{Q(x_i)K(x_j)^T}}$$

The attention vector can be expressed as:

$$g(x_i, x_j) = e^{Q(x_i)K(x_j)^T)} V(x_j) \quad (8)$$

If the interaction model 516 includes multiple attention layers 518b, the agent importance prediction model 508 can compute the agent importance scores 526 on each of the attention layers. The agent importance scores 526 of the multiple attention layers can be aggregated using an aggregation function 524. The aggregation function 524 can include an average, a median, a maximum, or a last value extraction. For example, the agent importance scores 526 of the multiple attention layers can be averaged to generate an average importance score 526 used to generate the output 495.

In an experimental implementation of the agent importance prediction model 508, agents with predicted importance scores 526 exceeding a set importance score threshold are determined as having a high impact on the vehicle ego behavior. To demonstrate the agent impact, the agents in each scene can be ranked (sorted) by their importance score 526 and each agent can be removed, to determine how the predicted ego trajectory changes in response to agent removal. Table 1 below illustrates the results of the above experimental implementation.

The agent importance prediction model 508 can determines a correlation between the normalized attention value (e.g., importance score) assigned to the removed agent and the point-wise L2 distance of the predicted ego trajectory before and after removing the agent, as well as the correlation to the amount of change in the prediction L2 error (forward loss corresponding to forward prediction or cycle loss for backward prediction) with respect to the ground-truth ego trajectory before and after removal. A Pearson correlation and R-squared values for each quantity are determined and/or reported. The R-squared values corresponding to the amount of variance explained by the dependent variable in a linear model.

TABLE 1

| k-th Agent | Predicted trajectory delta correlation | | Predicted trajectory delta correlation | |
|---|---|---|---|---|
| | Pearson | $R^2$ | Pearson | $R^2$ |
| 1 | .477 | .128 | .228 | .16 |
| 2 | .341 | .073 | .116 | .005 |
| 3 | .211 | .028 | .044 | .0008 |
| All | .200 | .117 | .040 | .14 |

As shown in Table 1, the agent importance prediction model 508 removes the k-th highest attended agent, and shows correlation between the predicted ego trajectory delta and attention value, as well as the correlation between the predicted ego trajectory error (with respect to ground-truth ego trajectory) delta and attention value. The last row contains the results for an experiment in which all other agents are removed in the scene, and the correlation using the sum of the attention values of all agents is determined.

If the correlation between the attention value of the agent removed and the change in predicted ego trajectory is highly positive, the correlation indicates that the agent importance prediction model 508 assigns high importance scores 526 to agents that have high impact on the ego plan of the vehicle 200. The correlation decreases as the number of agent ranking k increases, meaning the ego trajectory is more correlated with the higher attended agents.

The last row of Table 1 above, in which all other attended agents are removed, shows a reduction in the Pearson correlation with regards to each of the other rows despite the fact that experiment removes the most attention. The low Pearson correlation indicates that overall the total removed attention was less effective than the same amount of attention attributed to the other single removal experiments. In view of the Pearson correlations decrease with regards to rank, it can be concluded that the agent importance prediction model 508 is accurately assigning more attention to the most important agents.

In some embodiments, the determined ranking associated with the agent importance scores 526 can be used to adjust the trajectory path of the vehicle 200 using ground truth mixing, by applying fine adjustment for agents with high importance ranks and coarse adjustment for agents with low importance ranks, to minimize processing requirements.

FIG. 6A illustrates an example distribution 600A of ego trajectory delta between pre- and post-removal of the highest attended agent that can be generated by an agent importance prediction component (e.g., agent importance prediction model 508 described with reference to FIGS. 5A and 5B). The example distribution 600A confirms the conclusion that agents that are predicted to have high importance scores (e.g., high attention values) also have high importance on the ego behavior.

Figure 6B:
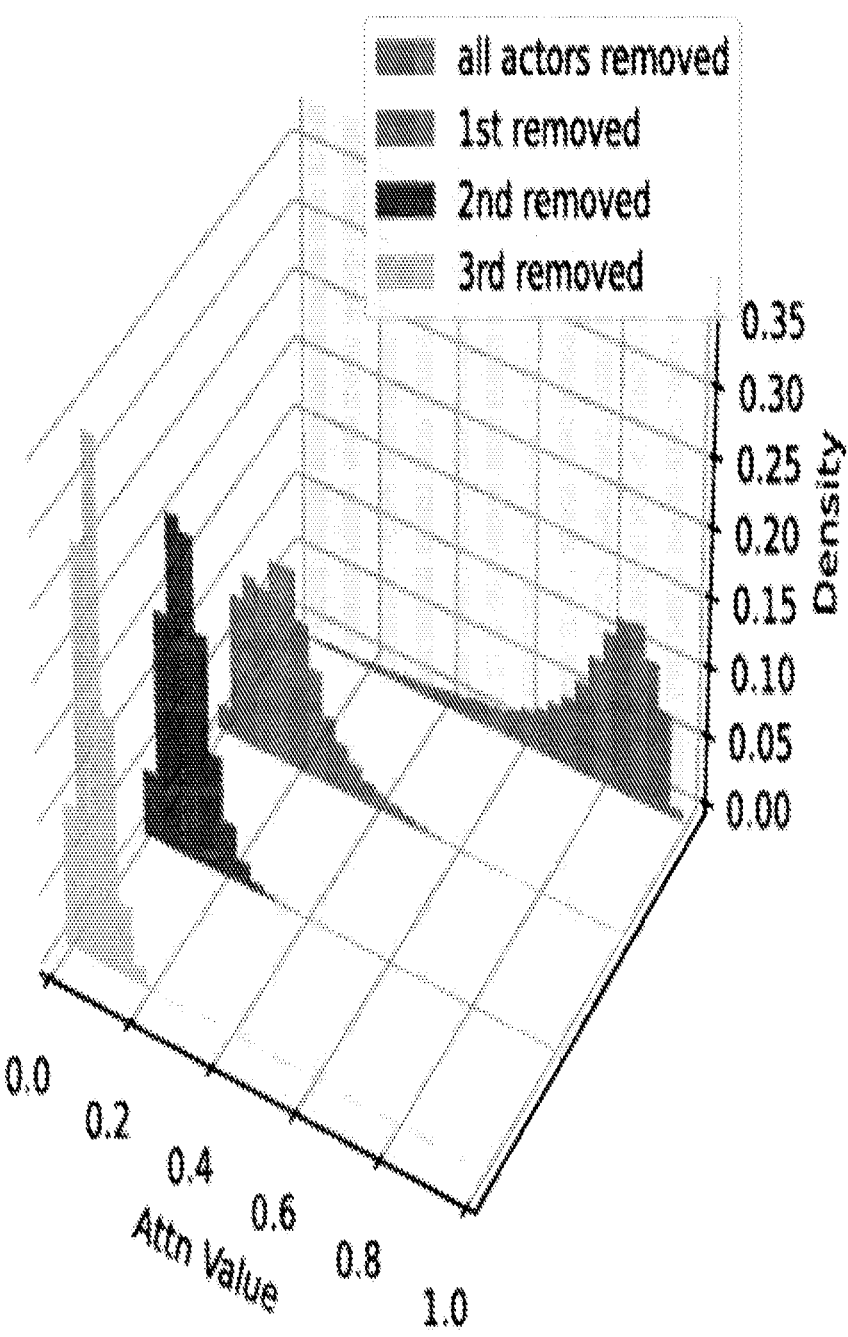

FIG. 6B illustrates an example distribution 600B of attention values between pre- and post-removal of the highest attended agent that can be generated by an agent importance prediction component (e.g., agent importance prediction model 508 described with reference to FIGS. 5A and 5B). The example distribution 600B confirms the conclusion that agents that are predicted to have high importance scores (e.g., high attention values) also affect the overall attention value.

Table 2 illustrates a quantile distribution of 1) attention value of the highest attended agent, 2) the number of agents with at least 0.1 normalized attention value, 3) maximum (over all agents) attention changes between the two attention layers, and 4) trajectory angular delta. The trajectory angle is defined as the angle of the vector from the ego's current position to the last predicted waypoint, and the delta between the pre- and post-agent removal predictions are determined. Thus, the vast majority of ego vehicles experience very small and typically negligible maximum angle change. However, in some rare cases, there are significant angular deltas, such as when the highest likelihood modality changes at an upcoming fork in the road depending on the agent in front of the ego, or more commonly when the prediction switches to an adjacent lane change.

TABLE 2

| Quantile distributions. | | | | | | |
|---|---|---|---|---|---|---|
| Quantity | 0 | 30 | 50 | 80 | 90 | 100 |
| Highest attentions | .003 | .117 | .165 | .245 | .307 | .748 |
| # relevant agents | 0 | 1 | 2 | 3 | 3 | 7 |
| Max attention shift | .003 | .306 | .371 | .485 | .553 | .812 |
| Trajectory angular delta [rad] | 0 | .001 | .002 | .01 | .044 | .283 |

Figure 7A:
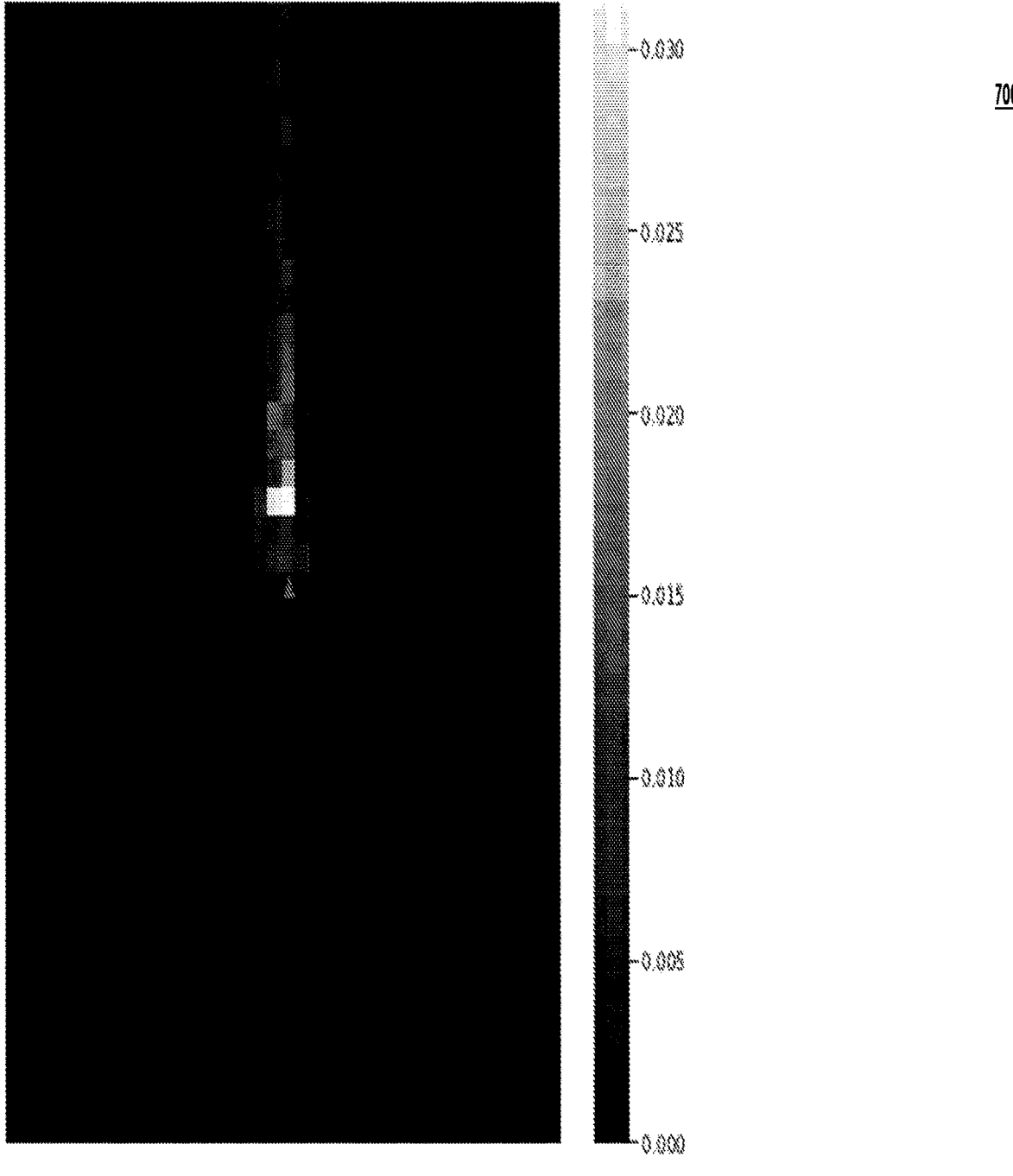
FIGS. 7A and 7B illustrate examples of plots showing an average normalized attention value in an ego-centric coordinate frame.
Figure 7B:
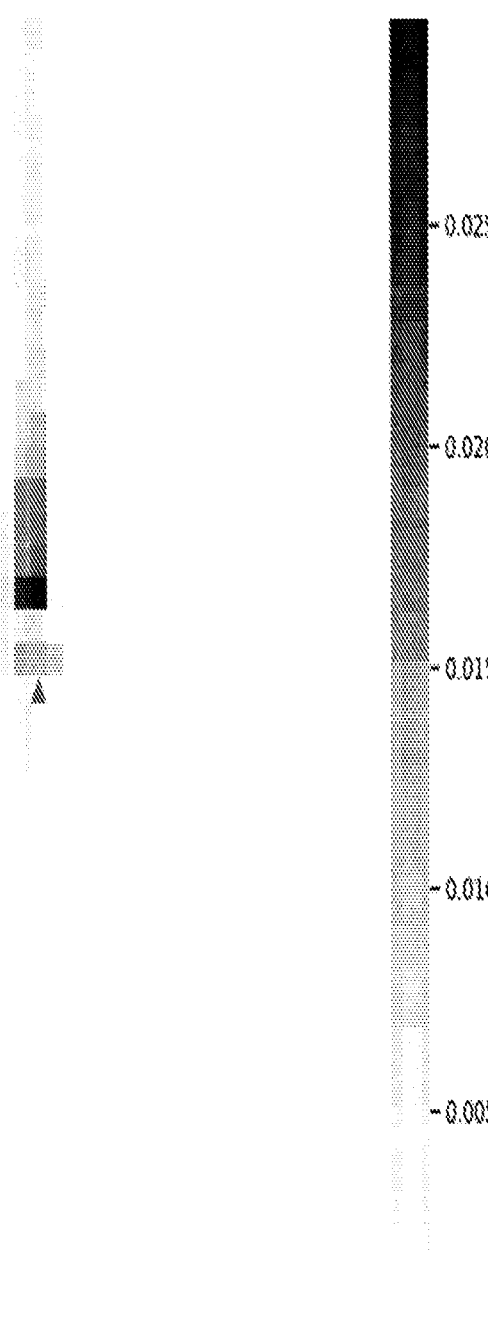

FIGS. 7A and 7B illustrate examples of plots 700A, 700B showing an average normalized attention value (e.g., importance score) per 4×4 meter block in the ego-centric coordinate frame using different color codes. The plots of average normalized attention value, such as 700A, 700B can be generated by an agent importance prediction component (e.g., agent importance prediction model 508 described with reference to FIGS. 5A and 5B). As can be seen the majority of the attention is placed on agents directly in front of the ego agent since those are the agents whose future behavior would most likely cause the ego agent to behave differently. In comparison, very little attention is typically paid to vehicles behind the ego since their presence usually wouldn't impact how the ego vehicle should behave unless the ego needed to adjust its path to avoid a future collision with the agent behind it.

In another experiment, an ablation study was performed to compare different aggregation functions to aggregate the attention values (e.g., importance scores) from multiple attention layers using an agent importance prediction component (e.g., agent importance prediction model 508 described with reference to FIGS. 5A and 5B). Table 3 illustrates a comparison using three aggregation functions: 1) maximum attention among all layers, 2) average attention among all layers, and 3) only use the attention of the last layer. The correlation between ego trajectory delta and the importance score are compared, and the result shows that all three functions yield similar results, which means the techniques discussed in the present disclosure method is robust to the selection of aggregation function.

TABLE 3

Correlation between ego trajectory delta and attention values with different attention aggregation functions.

| Aggregation Function | Predicted trajectory delta correlation | |
|---|---|---|
| | Pearson | $R^2$ |
| Max | .524 | .275 |
| Mean | .498 | .248 |
| Last | .512 | .262 |

The techniques discussed in the present disclosure system perform an allocation of attention to agents surrounding an ego vehicle and shows that the normalized magnitude of the attention vector produced by the model for each agent is a good indicator of the underlying importance score of each agent. By using those attention values as the agent importance scores, the agents that will have high impact on the ego trajectory can be prioritized.

FIG. 8 illustrates an example process 800 for predicting agent importance score for autonomous driving, according to some embodiments of the techniques discussed in the present disclosure. In some embodiments, one or more of the steps described with respect to the example process 800 is performed (e.g., completely, partially, and/or the like) by an autonomous system or device or group of devices, as described with reference to FIGS. 1-5. For example, one or more of the operations described with respect to process 800 is performed (e.g., completely, partially, sequentially, non-sequentially, and/or the like) by the perception system 402, the planning system 404, and/or the control system 408 of the autonomous vehicle compute 400 and/or a vehicle controller (e.g., vehicle controller 504 described with reference to FIGS. 5A and 5B) of a vehicle (e.g., vehicle 102*a*, 102*b*, 102*n* described with reference to FIG. 1 or vehicle 200 described with reference to FIG. 2). Additionally, or alternatively, in some embodiments, one or more steps described with respect to the process 800 is performed (e.g., completely, partially, sequentially, non-sequentially, and/or the like) by another device or group of devices separate from or including the autonomous vehicle compute 400.

At 802, one or more input features associated with one or more agents (e.g., vehicles, pedestrians, objects, etc.) in the plurality of agents present in an environment surrounding the vehicle are processed (e.g., by the ego vehicle's controller 504). The features associated with one or more agents can be detected by one or more sensing devices (e.g., V2I device 110 described with reference to FIG. 1, cameras 202*a*, LiDAR sensors 202*b*, radar sensors 202*c*, and microphones 202*d* described with reference to FIG. 2, perception system 402 described with reference to FIG. 4, vehicle's sensors 502 attached to the vehicle described with reference to FIGS. 5A and 5B). The sensing devices can be attached to or integrated in the vehicle to identify static and mobile agents present in an environment surrounding the vehicle. For example, the sensing devices can monitor parameters associated with the agents relative to the movement of the respective vehicle and parameters associated with the vehicle, to which they are attached. The parameters associated to the environment surrounding the vehicle can include, but are not limited to, parameters associated with movement of other vehicles (e.g., speed, direction, etc.) and/or other objects (e.g., pedestrians, light poles, etc.). The parameters associated with the vehicle can include, but are not limited to, parameters associated with vehicle's state, e.g., heading, driving speed, etc. Additionally, the parameters associated to the vehicle can include, but are not limited to, parameters associated with vehicle's operational status and indicators or potential malfunctions, e.g., tire inflation pressure, oil level, transmission fluid temperature, etc. The data including one or more measured and/or monitored parameters and collected by the sensing devices can transmitted to the vehicle controller (e.g., vehicle controller 504 described with reference to FIGS. 5A and 5B) to be processed as input data (features).

At 804, one or more output features associated with the one or more agents are determined based on processing the one or more input features (e.g., according to the process described with reference to FIGS. 5A and 5B). For example, determining the one or more output features can include determining the one or more output features based on an interaction between the one or more agents and the one or more input features. In some implementations, determining the one or more output features based on the interaction includes modeling the interaction between the one or more agents as a single attention layer or as multiple attention layers. If the interaction is modeled as a single attention layer, contributions of each of the one or more agents are computed using an interaction function. The interaction function can include an attention vector from a first agent of the plurality of agents to a second agent of the plurality of agents. If the interaction is modeled as multiple attention layers, contributions of each of the one or more agents are determined using an interaction function (including attention vectors between agents) for each of the plurality of attention layers. If the interaction is modeled as multiple attention layers, the importance score of each agent is determined as an aggregate function across the plurality of attention layers. The output features associated with the one or more agents can include a trajectory prediction of the future trajectories of the agents identified within the environment based on respective history tracks of the agents and based on map information (defining at least a portion of the input features). The output features can be adjusted based on a predicted behavior relative to the state of other agents. For example, the output features can be generated using a model of agent interactions implemented in an agent importance prediction component (e.g., agent importance prediction model 508 described with reference to FIGS. 5A and 5B), such as a graph attention mechanism for modeling agent interactions.

At 806, an importance score of each agent of the one or more agents using the determined one or more output features (predicted location of agents) is predicted (e.g., using the transformer model 482 described with reference to FIG. 4 and/or according to the process described with reference to FIGS. 5A and 5B). The importance of each agent can be predicted, by the agent importance prediction component, with or without training labels. The importance score of each agent can represent ranked interactions between agents in a graph. For example, a ranking of the plurality of agents present in an environment surrounding a vehicle based on the importance score of each agent indicative of a respective impact of each agent on the movements of the vehicle can be generated. Agent importance score prediction can be based on an aggregation of the agent importance scores of multiple attention layers, each attention layer defining a possible combination of interactions between agents. The aggregation of the agent importance scores of multiple attention layers can include average, maximum importance score, or the importance score from the last attention layer. The agents with high predicted importance scores can be defined as the agents that have a high impact on the ego behavior, due to which a trajectory of the vehicle can be adjusted (e.g., to avoid a collision with the agents with high predicted importance scores). In some implementations, a correlation between the importance score assigned to a respective agent removed from the one or more agents and a distance of the one or more movements of the vehicle before and after removing the removed agent is determined. The importance score of each agent in the one or more agents can be normalized using the at least one processor using the correlation.

At 808, one or more movements of the vehicle are determined based on the predictions including the importance score of each agent of the one or more agents, using, for example a single attention layer or a multi-layer interaction model, as described with reference to FIGS. 5A and 5B. The movements of the vehicle can include a path of travel, direction, speed, and/other movement and/or maneuver parameters that optimize a displacement of the vehicle towards a target position in a safe mode (avoiding collisions) with a minimum cost (shortest travel time to destination, minimal energy consumption, and/or shortest distance). The determined movements of the vehicle can be used to control one or more systems of the vehicle (e.g., steering control system 206 described with reference to FIG. 2) to control the vehicle to execute the determined movements. One or more movements of the vehicle can be adjusted based on the ranking of the agents.

According to some non-limiting embodiments or examples, provided is a system, comprising: at least one sensing device configured to detect one or more input features associated with one or more agents in a plurality of agents present in an environment surrounding a vehicle, and a vehicle controller comprising at least one processor and at least one non-transitory storage media storing instructions that, when executed by the at least one processor, cause the at least one processor to perform operations comprising: processing, using at least one processor, the one or more input features associated with the one or more agents in the plurality of agents present in the environment surrounding the vehicle; determining, using the at least one processor, one or more output features associated with the one or more agents based on the one or more input features; predicting, using the at least one processor, an importance score of each agent in the one or more agents based on the one or more output features; and determining, using the at least one processor, based on the importance score of each agent in the one or more agents, one or more movements of the vehicle.

According to some non-limiting embodiments or examples, provided is at least one non-transitory computer-readable medium comprising one or more instructions that, when executed by at least one processor, cause the at least one processor to: processing, using at least one processor, the one or more input features associated with the one or more agents in the plurality of agents present in the environment surrounding the vehicle; determining, using the at least one processor, one or more output features associated with the one or more agents based on the one or more input features; predicting, using the at least one processor, an importance score of each agent in the one or more agents based on the one or more output features; and determining, using the at least one processor, based on the importance score of each agent in the one or more agents, one or more movements of the vehicle.

According to some non-limiting embodiments or examples, provided is a method, comprising: processing, by/using at least one processor, the one or more input features associated with the one or more agents in the plurality of agents present in the environment surrounding the vehicle; determining, by/using the at least one processor, one or more output features associated with the one or more agents based on the one or more input features; predicting, by/using the at least one processor, an importance score of each agent in the one or more agents based on the one or more output features; and determining, by/using the at least one processor, based on the importance score of each agent in the one or more agents, one or more movements of the vehicle.

Further non-limiting aspects or embodiments are set forth in the following numbered clauses:

Clause 1. A system, comprising: at least one sensing device configured to detect one or more input features associated with one or more agents in a plurality of agents present in an environment surrounding a vehicle, and a vehicle controller comprising at least one processor and at least one non-transitory storage media storing instructions that, when executed by the at least one processor, cause the at least one processor to perform operations comprising: processing, using at least one processor, the one or more input features associated with the one or more agents in the plurality of agents present in the environment surrounding the vehicle; determining, using the at least one processor, one or more output features associated with the one or more agents based on the one or more input features; predicting, using the at least one processor, an importance score of each agent in the one or more agents based on the one or more output features; and determining, using the at least one processor, based on the importance score of each agent in the one or more agents, one or more movements of the vehicle.

Clause 2. The system of clause 1, wherein the vehicle controller comprises an agent importance prediction model configured to determine the one or more output features based on an interaction between the one or more agents and the one or more input features, wherein the one or more input features comprise parameters defining location and movement of the plurality of agents present in the environment surrounding the vehicle.

Clause 3. The system of any of the preceding clauses, wherein the agent importance prediction model comprises an agent to agent attention system, a transformer attention system, and/or a trajectory prediction model.

Clause 4. The system of any of the preceding clauses, wherein the trajectory prediction model comprises an interaction model using a single attention layer, wherein contributions of each of the one or more agents are computed using an interaction function, wherein the interaction function comprises an attention vector from a first agent of the plurality of agents to a second agent of the plurality of agents.

Clause 5. The system of any of the preceding clauses, wherein the trajectory prediction model comprises an interaction model using a plurality of attention layers, wherein contributions of each of the one or more agents are determined using an interaction function for each of the plurality of attention layers, wherein the importance score of each agent is determined as an aggregate function across the plurality of attention layers.

Clause 6. The system of any of the preceding clauses, wherein the at least one sensing device is positioned on the vehicle.

Clause 7. The system of any of the preceding clauses, wherein the at least one sensing device comprises at least one of: a camera, a motion sensor, an image capturing device, a scanner, and any combination thereof.

Clause 8. A method comprising: processing, using at least one processor, one or more input features associated with one or more agents in a plurality of agents present in an environment surrounding a vehicle; determining, using the at least one processor, one or more output features associated with the one or more agents based on the one or more input features; predicting, using the at least one processor, an importance score of each agent in the one or more agents based on the one or more output features; and determining, using the at least one processor, based on the importance score of each agent in the one or more agents, one or more movements of the vehicle.

Clause 9. The method of clause 8, wherein determining the one or more output features comprises: determining the one or more output features based on an interaction between the one or more agents and the one or more input features.

Clause 10. The method of any of the preceding clauses, wherein determining the one or more output features based on the interaction comprises modeling the interaction between the one or more agents using a single attention layer, wherein contributions of each of the one or more agents are determined using an interaction function.

Clause 11. The method of any of the preceding clauses, wherein the interaction function comprises an attention vector from a first agent of the plurality of agents to a second agent of the plurality of agents.

Clause 12. The method of any of the preceding clauses, wherein determining the one or more output features based on the interaction comprises modeling the interaction between the one or more agents using as a plurality of attention layers, wherein contributions of each of the one or more agents are determined using an interaction function for each of the plurality of attention layers.

Clause 13. The method of any of the preceding clauses, wherein the importance score of each agent is determined as an aggregate function across the plurality of attention layers.

Clause 14. The method of any of the preceding clauses, further comprising: modifying the one or more input features by sequentially removing each agent of the one or more agents forming a set of reduced agents; and determining, using the at least one processor, the one or more output features associated with the set of reduced agents based on the modified one or more input features.

Clause 15. The method of any of the preceding clauses, further comprising: determining a correlation between the importance score assigned to a respective agent to be removed from the one or more agents, as a removed agent, and a distance of the one or more movements of the vehicle before and after removing the removed agent; and normalizing, using the at least one processor, the importance score of each agent in the one or more agents using the correlation.

Clause 16. The method of any of the preceding clauses, wherein the one or more input features associated with one or more agents are detected using at least one sensing device positioned on the vehicle.

Clause 17. The method of any of the preceding clauses, wherein the at least one sensing device comprises at least one of: a camera, a motion sensor, an image capturing device, a scanner, and any combination thereof.

Clause 18. The method of any of the preceding clauses, further comprising: generating a ranking of the plurality of agents present in an environment surrounding a vehicle based on the importance score of each agent indicative of a respective impact of each agent on the movements of the vehicle; and adjusting the one or more movements of the vehicle based on the ranking of the plurality of agents.

Clause 19. The method of any of the preceding clauses, further comprising: causing the vehicle to operate based on the one or more movements.

Clause 20. At least one non-transitory storage media storing instructions that, when executed by at least one processor, cause the at least one processor to perform operations comprising: processing, using at least one processor, one or more input features associated with one or more agents in a plurality of agents present in an environment surrounding a vehicle; determining, using the at least one processor, one or more output features associated with the one or more agents based on the one or more input features; predicting, using the at least one processor, an importance score of each agent in the one or more agents based on the one or more output features; and determining, using the at least one processor, based on the importance score of each agent in the one or more agents, one or more movements of the vehicle.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step and/or sub-entity of a previously-recited step or entity.

What is claimed is:

1. A system, comprising:
at least one sensing device configured to detect one or more input features associated with one or more agents in a plurality of agents present in an environment surrounding a vehicle, and
a vehicle controller comprising at least one processor and at least one non-transitory storage media storing instructions that, when executed by the at least one processor, cause the at least one processor to perform operations comprising:
processing, using at least one processor, the one or more input features associated with the one or more agents in the plurality of agents present in the environment surrounding the vehicle;
determining, using the at least one processor, one or more output features associated with the one or more agents based on the one or more input features;
predicting, using the at least one processor, an importance score of each agent in the one or more agents based on the one or more output features by iteratively determining correlations between predicted trajectories of the vehicle and respective agents when removed from a scene;
determining, using the at least one processor, based on the importance score of each agent in the one or more agents, one or more movements of the vehicle; and
executing the one or more movements by the vehicle.

2. The system of claim 1, wherein the vehicle controller comprises an agent importance prediction model configured to determine the one or more output features based on an interaction between the one or more agents and the one or more input features, wherein the one or more input features comprise parameters defining location and movement of the plurality of agents present in the environment surrounding the vehicle.

3. The system of claim 2, wherein the agent importance prediction model comprises an agent to agent attention system, a transformer attention system, and/or a trajectory prediction model.

4. The system of claim 3, wherein the trajectory prediction model comprises an interaction model using a single attention layer, wherein contributions of each of the one or more agents are computed using an interaction function, wherein the interaction function comprises an attention vector from a first agent of the plurality of agents to a second agent of the plurality of agents.

5. The system of claim 3, wherein the trajectory prediction model comprises an interaction model using a plurality of attention layers, wherein contributions of each of the one or more agents are determined using an interaction function for each of the plurality of attention layers, wherein the importance score of each agent is determined as an aggregate function across the plurality of attention layers.

6. The system of claim 1, wherein the at least one sensing device is positioned on the vehicle.

7. The system of claim 1, wherein the at least one sensing device comprises at least one of: a camera, a motion sensor, an image capturing device, a scanner, and any combination thereof.

8. A method comprising:
processing, using at least one processor, one or more input features associated with one or more agents in a plurality of agents present in an environment surrounding a vehicle;
determining, using the at least one processor, one or more output features associated with the one or more agents based on the one or more input features;
predicting, using the at least one processor, an importance score of each agent in the one or more agents based on the one or more output features by iteratively determining correlations between predicted trajectories of the vehicle and respective agents when removed from a scene;
determining, using the at least one processor, based on the importance score of each agent in the one or more agents, one or more movements of the vehicle; and
executing the one or more movements by the vehicle.

9. The method of claim 8, wherein determining the one or more output features comprises: determining the one or more output features based on an interaction between the one or more agents and the one or more input features.

10. The method of claim 9, wherein determining the one or more output features based on the interaction comprises modeling the interaction between the one or more agents using a single attention layer, wherein contributions of each of the one or more agents are determined using an interaction function.

11. The method of claim 10, wherein the interaction function comprises an attention vector from a first agent of the plurality of agents to a second agent of the plurality of agents.

12. The method of claim 9, wherein determining the one or more output features based on the interaction comprises modeling the interaction between the one or more agents using as a plurality of attention layers, wherein contributions of each of the one or more agents are determined using an interaction function for each of the plurality of attention layers.

13. The method of claim 12, wherein the importance score of each agent is determined as an aggregate function across the plurality of attention layers.

14. The method of claim 8, further comprising:

modifying the one or more input features by sequentially removing each agent of the one or more agents forming a set of reduced agents; and determining, using the at least one processor, the one or more output features associated with the set of reduced agents based on the modified one or more input features.

15. The method of claim 14, further comprising:

determining a correlation between the importance score assigned to a respective agent to be removed from the one or more agents, as a removed agent, and a distance of the one or more movements of the vehicle before and after removing the removed agent; and normalizing, using the at least one processor, the importance score of each agent in the one or more agents using the correlation.

16. The method of claim 8, wherein the one or more input features associated with one or more agents are detected using at least one sensing device positioned on the vehicle.

17. The method of claim 16, wherein the at least one sensing device comprises at least one of: a camera, a motion sensor, an image capturing device, a scanner, and any combination thereof.

18. The method of claim 8, further comprising:

generating a ranking of the plurality of agents present in an environment surrounding a vehicle based on the importance score of each agent indicative of a respective impact of each agent on the movements of the vehicle; and adjusting the one or more movements of the vehicle based on the ranking of the plurality of agents.

19. The method of claim 8, further comprising:

causing the vehicle to operate based on the one or more movements.

20. At least one non-transitory storage media storing instructions that, when executed by at least one processor, cause the at least one processor to perform operations comprising:

processing, using at least one processor, one or more input features associated with one or more agents in a plurality of agents present in an environment surrounding a vehicle;

determining, using the at least one processor, one or more output features associated with the one or more agents based on the one or more input features;

predicting, using the at least one processor, an importance score of each agent in the one or more agents based on the one or more output features by iteratively determining correlations between predicted trajectories of the vehicle and respective agents when removed from a scene;

determining, using the at least one processor, based on the importance score of each agent in the one or more agents, one or more movements of the vehicle; and executing the one or more movements by the vehicle.

* * * * *